United States Patent [19]

Krempl et al.

[11] 4,391,147

[45] Jul. 5, 1983

[54] TRANSDUCER DEVICE FOR MEASURING MECHANICAL VALUES ON HOLLOW BODIES

[75] Inventors: Peter W. Krempl, Vienna; Peter Claassen; Rudolf Zeiringer, both of Graz, all of Austria

[73] Assignee: Hans List, Graz, Austria

[21] Appl. No.: 242,456

[22] Filed: Mar. 11, 1981

[30] Foreign Application Priority Data

Mar. 19, 1980 [AT] Austria ................................. 1501/80

[51] Int. Cl.³ .......................... G01L 7/02; H01L 41/18
[52] U.S. Cl. .................................... 73/730; 73/119 A; 73/DIG. 4; 310/328; 310/338
[58] Field of Search .............. 73/730, 119 A, DIG. 4, 73/432 R; 338/4; 310/338, 328

[56] References Cited

U.S. PATENT DOCUMENTS

| | | | |
|---|---|---|---|
| 4,194,401 | 3/1980 | Claassen et al. | 73/730 |
| 4,216,403 | 8/1980 | Krempl et al. | 73/119 A |
| 4,296,635 | 10/1981 | Claassen et al. | 73/730 |
| 4,321,833 | 3/1982 | Zeiringer | 73/730 |

*Primary Examiner*—Donald O. Woodiel
*Attorney, Agent, or Firm*—Watson, Cole, Grindle & Watson

[57] ABSTRACT

A transducer device for measuring mechanical values on hollow bodies, which comprises a housing and at least one elastic sensor element mounted in the housing. The element is so formed as to be connected with at least two points of the housing and has a free length between these connecting points so as to be stretched over the surface of the hollow body when the transducer device is attached.

17 Claims, 7 Drawing Figures

TRANSDUCER DEVICE FOR MEASURING MECHANICAL VALUES ON HOLLOW BODIES

BACKGROUND OF THE INVENTION

This invention relates to a transducer device for measuring mechanical values on hollow bodies, and especially for measuring pressure distributions within a pipe by detecting deformations in the outer surface thereof. The transducer device comprises a housing for detachably enclosing the pipe whose outer surface deformation is to be measured, and at least one elastic sensor element which is mounted in the housing and capable of at least indirectly contacting the surface of the enclosed pipe. Each of the sensor elements has electrical connections for taking off the measuring signals.

DESCRIPTION OF THE PRIOR ART

A transducer device of the kind mentioned above is known, e.g., from Austrian Pat. No. 353 507 and has a supporting element arranged between the elastic sensor element and a rigid housing which encloses the pipe to be measured when the transducer is attached. By this supporting element the sensor element is forced elastically and substantially at a right angle to the surface of the pipe. Thereby, deformations in the outer surface of the pipe, which correspond to pressure distributions within the pipe, are transmitted frictionally to the sensor element, which thereby converts these deformations into measuring signals corresponding to the internal pressure to be measured.

Because of the almost exclusive radially acting force applied by the elastic supporting element to the sensor element a tangential sliding between the surface of the pipe and the sensor element can occur especially at heavily soiled or greasy pipes, whereby the accuracy of the measurement can be affected.

Furthermore, this known arrangement allows for only comparatively small deviations in the diameter of the pipe to be measured, which also is disadvantageous in some cases of application.

From German Laid Open Print No. 2 831 939 a transducer device is known which comprises a piezoelectric film, which acts as a sensor element and is stretched around the pipe by means of an attaching spring when the transducer is mounted. The attaching spring is formed so as to enclose slightly more than half the circumference of the pipe with both its outer bearing surfaces and the piezoelectric element therefore being stretched approximately around half the circumference of the pipe. This arrangement is disadvantageous because of the necessity for an exact dimensioning of the spring, which on the one hand has to embrace the pipe strong enough to prevent any disturbance of the measuring signal caused by any movement of the device relative to the pipe, and on the other hand has to open sufficiently wide to allow the transducer device to be mounted on to the pipe. Furthermore, the spurial signals generated by mechanical oscillations of the pipe cannot be compensated in this arrangement because of the piezo film contacting the pipe only on one side thereof.

Two other transducer devices for the measurement of mechanical values on hollow bodies are known from U.S. Pat. No. 4,090,404. In the first embodiment the pipe is forced against a solid support by means of a stripe which carries a wire strain gauge. The prestressing of the stripe is generated by the fixing of the stripe on both sides of the support. It is disadvantageous—similarly to the above mentioned embodiment with an attaching spring—in that the sensor element is only in contact with one side of the pipe, whereby the same bending vibrations of the pipe are picked up and the measuring signals, and are disturbed in that the transducer is not easy to handle because of the necessity to screw the stripe carrying the strain gauge to the support. In the second of the embodiments known from this patent a wire strain gauge acting as a sensor element is fixed to a U-shaped solid body which is forced by an elastic endorsing element to the pipe, whereby the sensor element is stretched. This embodiment has the disadvantage that the U-shaped carriers are generating spurious signals when their masses are vibrating with the pipe and that an exact compensation of bending vibrations of the pipe is not possible, because in this case the U-shaped carriers would vibrate between the elastic endorsing elements and disturb the measuring signals.

SUMMARY OF THE INVENTION

It is an object of the present invention to improve upon a transducer device of the kind mentioned above in such a way that a correct measurement can be performed even for soiled or greasy pipes, that comparatively great off-sizes in the diameter of the pipe are made possible, and that even in the presence of strong mechanical vibrations of the hollow body no disturbance of the measuring signals results from the vibrating masses or from bending vibrations.

According to the present invention this can be effected by a sensor element or sensor elements, respectively, being connected to at least two points of the housing and having a free length between the connecting points to the housing so as to be stretched over the surface of the pipe when the transducer device is attached thereto. Thus, the sensor element is connected safely to the housing only at points between which it contacts the outer surface of the hollow body at least partially when the transducer device is mounted, and is stretched between these points freely over the surface of the hollow body on which the transducer device is mounted. The contact pressure against the hollow body or prestressing in the sensor element, respectively, which is necessary for a satisfactory measurement, is created just only via the length of the sensor element between the connecting points to the housing, which is so great as to ensure that the sensor element is stressed by the hollow body to be measured when the transducer device is mounted, whereby the contact pressure or prestressing, respectively, is achieved via this stressing. Thereby, relatively great deviations in the diameter of the pipe result in just very low deviations of the contact pressure or the prestressing, respectively, and are usually negligible in measurements of this kind. A frictional connection, which cannot be assured in certain cases with soiled or greasy surfaces of the hollow body to be measured, between the surface of the hollow body and the sensor element is not necessary and the influence of the tangential sliding between the sensor element and the surface of the hollow body at soiled or greasy surfaces to the measuring signals is avoided.

As the sensor element is connected at its ends directly to the housing and the housing itself is mounted for the measurement on the hollow body in such a way that it cannot vibrate relatively to the hollow body, no transmission of vibrations to the sensor element can occur and any disturbance in the measuring signal is prevented.

In another embodiment of the present invention the housing of the transducer device is bipartite and each part thereof supports at least one of the sensor elements. Furthermore, it is possible that at least two sensitive parts of the sensor elements are allocated in the housing so as to be arranged at least approximately symmetrically with respect to the major axis of the hollow body when the transducer is mounted. By such an arrangement of the sensitive parts a compensation of disturbing influences of bending vibrations of a pipe to be measured and of forces due to inertia of the sensor element is effected in a simple way. Different degrees of sensitivity of the single sensitive parts or sensor elements can also be balanced via the dimension, number, shape, or arrangement of the sensitive parts or of the single sensor elements.

In order to simplify the manufacture and to improve the handling of the transducer device at least one part of the sensor element can be made in one piece with the housing. It is especially advantageous if the sensor element comprises several layers and at least one of these layers is made in one piece with the housing. According to a further development of this invention, that part of the sensor element which is made in one piece with the housing is at least locally sensitive to the surface deformations to be detected. Thereby it is possible, e.g., that the housing of the transducer device together with at least one part of the sensor element consists of a suitable plastics material, which can be made sensitive in a way known in connection with the manufacture of sensor elements in that part thereof, which is stretched freely over the surface of the hollow body to be measured after the transducer is given its shape. If strain wire gauges are used, the strain wire lattice, which can also be divided in single sensitive zones, can be applied on the layer which is made in one piece with the housing.

This embodiment of the transducer device is especially robust and very simple to manufacture and to assemble.

According to a preferred embodiment of this invention just one sensor element is arranged in the housing, which embraces a substantial part of the circumference of the hollow body when the transducer is mounted thereon. The region on the surface of the hollow body which is stretched over by the sensor element when the transducer device is attached is thereby advantageously increased and further simplification of the manufacture and assembly of the transducer device is obtained.

In another embodiment of this invention the sensor element comprises a piezoelectric tape, the opposite surfaces of this tape being interconnected with electrically leading contact surfaces at least when the transducer is mounted to a hollow body to be measured. Due to the characteristics of piezoelectric sensor tapes, e.g., high flexibility, and an extensive independence of the measuring signals on the prestressing, these elements are especially suitable for the purposes of the present invention. It is also possible to apply the electrodes for charge take off just locally on the piezoelectric tape, whereby the sensor element is only sensitive in the so provided regions and an optimization of the compensation of spurious signals can be gained via the arrangement, number, dimension, and shape of these zones.

According to a further embodiment of the present invention the sensor element is coated at least at one side thereof with a protecting layer, whereby the danger of a mechanical injury by the hollow body to be measured and by other circumstances is significantly reduced.

In a further development of the invention the sensor element comprises a sensitive part for detecting deformations of the surface of the hollow body and a clamping element which is fixedly secured to the housing. Thereby the danger of damaging the usually highly susceptible sensor element, e.g., by a prestressing being too high because of a too great diameter of the pipe, can be reduced and the sensor element is protected at least at one side thereof against mechanical injury.

DESCRIPTION OF THE DRAWINGS

The present invention is hereinafter more specifically described with reference to the accompanying drawings, wherein.

DESCRIPTION OF THE PREFERRED EMBODIMENTS

Figure 1:
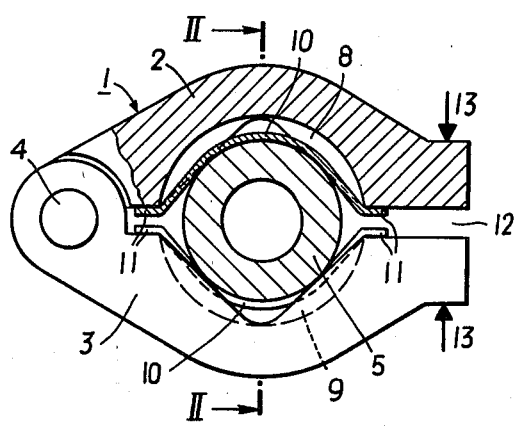
FIG. 1 shows a transducer device according to the invention in a partial sectional view taken along line I—I of FIG. 2.
Figure 2:
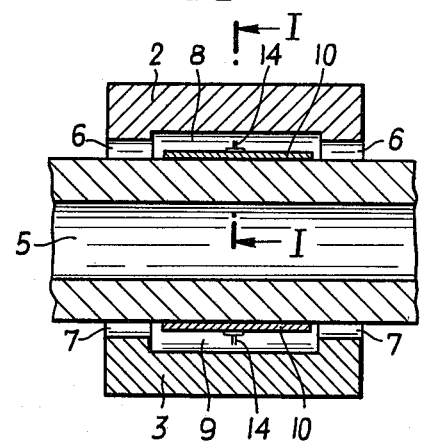
FIG. 2 shows a sectional view taken along line II—II of FIG. 1.

The housing 1 of a transducer device depicted in FIGS. 1 and 2 comprises 2 housing parts 2 and 3 which are on the one side thereof hingedly connected by a bolt 4 and carry on the side opposite the bolt 4 a clamping device (not shown) for fixing the transducer device to a pipe 5. Both of the housing parts 2 and 3 are so formed on the inner side thereof as to contact the circumference of the pipe 5 just only on their outer ends 6 and 7 when the transducer device is mounted and define a free space 8, 9 to the surface of the pipe 5 between the ends 6 and 7. These ends are—seen in the direction of the axis of the pipe 5—V-shaped, whereby the mounting of the housing 1 is easily possible even at pipes 5 which have relatively great deviations in diameter.

On the inside of each of the housing parts 2 and 3 a tape-shaped sensor element 10 is fixedly connected, e.g., glued, welded, clamped, in such a way, that it is only fixed to the housing parts 2 and 3 at its ends 11 and in the region of the transition from the free space 8, 9 to the gap 12, which remains between the two housing parts 2 and 3 when the transducer device is attached. The part of the sensor elements 10 lying between the ends 11 is not in contact with the housing parts 2 and 3. The sensor elements 10 have such a length that, when the transducer device is attached, that means that the V-shaped ends 6 and 7 are lying close to the pipe 5 and a clamping force acts in the direction of arrows 13, a contact pressure between the sensor elements 10 and the pipe 5, or a prestressing of the sensor elements 10, respectively, is created.

A tangentially sliding motion between the sensor element 10 and the surface of the pipe 7, which can occur in some cases with soiled or greasy pipes, cannot substantially effect the results of the measurement, as because of the arrangement of the sensor elements 10 in the housing 1 an increasing diameter of the pipe 5, as it, e.g., occurs with an increasing pressure within the pipe, leads in any case to an elongation of that part of the sensor element 10 which is stretched freely between the housing part 2 or 3, respectively, and the pipe 5. Furthermore, because of this arrangement of the sensor elements 10 a comparatively great deviation in the diameter of the pipe 5 is allowable without adulteration of the result of the measurement.

The take-off of the measuring signals from the sensor elements 10 is depicted schematically in FIG. 2 and is labelled 14.

Figure 3:
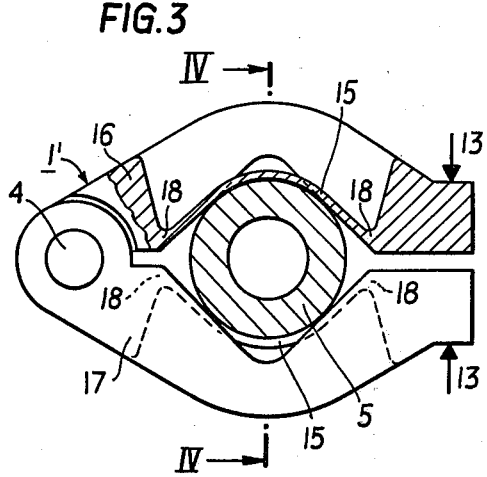
FIG. 3 shows another embodiment of this invention in a partial sectional view taken along line III—III of FIG. 4.
Figure 4:
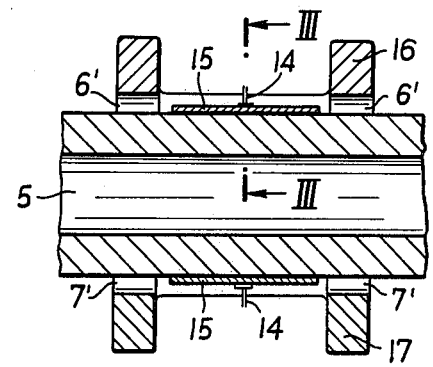
FIG. 4 shows a sectional view taken along line IV—IV of FIG. 3.

The transducer device according to FIGS. 3 and 4 includes sensor elements 15, which are made in one piece with the housing parts 16 and 17 of the housing 1'. The housing parts 16 and 17 are substantially frame shaped and on one side thereof formed so as to be hinge connected via a bolt 4. The housing parts 16 and 17 can be closed on the pipe 5 and fixed to the same by a clamping device (not shown) which produces a clamping force in the direction of arrows 13. The V-shaped ends 6' and 7' of the housing parts 16 and 17 lie close to the outer surface of the pipe 5, whereby comparatively great deviations in the diameter of the pipe 5 are accommodated.

The ends 18 of the sensor elements 15 unite with the housing parts 16 and 17 whereby advantages are obtained respecting the manufacture and assembly of the transducer device and the proper operation of the device even after a long working interval.

Furthermore, in this embodiment no extra cover for the sensor elements 15 by suitable housing parts is necessary, whereby the overall mass of the device, which is significant for the behaviour of the transducer device when used for measurements at vibrating pipes, is further reduced.

The take-off contacts for measuring signals are schematically depicted in FIG. 4 and are again labelled again 14.

Figure 5:
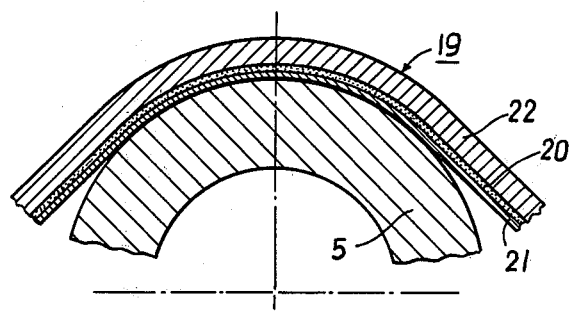
FIG. 5 shows a partial sectional view according to FIG. 3 of another embodiment of this invention.

FIG. 5 shows a detail of a further embodiment of a transducer device according to the present invention, with a sensor element 19 lying close to pipe 5. The sensor element 19 comprises a sensitive part 20, which is responsive to elongations and/or pressure, respectively, a protecting layer 21 arranged between the sensitive part 20 and the outer surface of the pipe 5, and a clamping element 22 arranged on that side of the sensor element 20 opposite the protecting layer 21. Due to the protecting layer 21 mechanical injuries of the sensitive part 20, which, e.g., can consist of a piezoelectric film or a strain wire gauge, are prevented. The clamping element 22, which is in a manner, fixedly secured to respective housing parts, prevents damage of the usually highly delicate sensitive part 20 because of an undue increase in prestressing, for example because of an exorbitant great diameter of the pipe 5. Simultaneously the clamping element 22 acts as a protection against mechanical injury of the sensitive part 20 if the housing of the transducer device is formed according to FIGS. 3 and 4.

Figure 6:
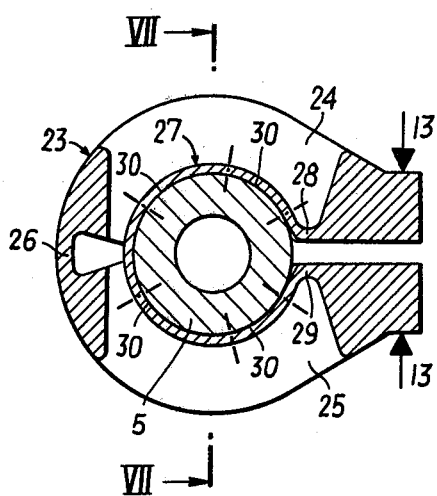
FIG. 6 shows a further embodiment of the present invention in a sectional view taken along line VI—VI of FIG. 7.
Figure 7:
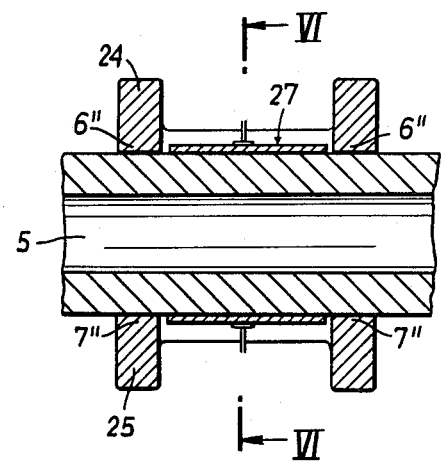
FIG. 7 shows a sectional view taken along line VII—VII of FIG. 6.

The transducer device according to FIGS. 6 and 7 includes a housing 23, which is made in one piece, e.g., out of a plastics material. Two substantially frame shaped housing parts 24 and 25 are flexibly connected by a region 26 which has a comparatively small wall thickness. Opposite the region 26 a clamping device (not shown) can be provided by means of which a clamping force can be applied in the direction of arrows 13. In this embodiment the outer ends 6" and 7" of the housing 23 are formed semicircular, whereby the housing parts 24, 25 lie close to a greater part the circumference of the pipe 5. The device is provided with a single tape shaped sensor element 27, which embraces almost the entire circumference of the pipe 5 when the transducer device is mounted thereon. The ends 28, 29 of the sensor element 27 are interconnected with the housing 23 or with the housing parts 24,25, respectively. In FIG. 6 the boundaries of three sensitive zones 30, which are located symmetrically to the axis of pipe 5 on the sensor element 27, are indicated by dash-dotted lines. This local sensitivity is obtained, e.g., by strain wire gauges applied only in specific regions, by local piezoelectric sensitivity, by charge take-off electrodes which are applied only in certain regions to a piezoelectric element, or by other suitable means. The dimension, number, shape, and arrangement of this zones is so chosen as to obtain the best possible compensation of spurious signals resulting, e.g., from bending vibrations. Moreover, it is possible that the sensor element 27 be sensitive over its entire length between the connecting points 28, 29 to the housing. This embodiment has the advantage, that a compensation of spurious signals occurs in a very simple manner already within the sensor element 27. Furthermore, the manufacture and assembly of this embodiment of a transducer device according to the invention is simplified because there is no necessity for an extra connecting element between the two housing parts.

We claim:

1. A transducer device for measuring mechanical values on hollow bodies, especially for measuring pressure distributions within a pipe by detecting deformations in the outer surface thereof, comprising a housing for detachably enclosing the pipe whose outer surface deformation is to be measured, and at least one elastic sensor element being mounted in said housing, said sensor element being capable to at least indirectly contact the surface of said enclosed pipe and having electrical connections for taking off the measuring signals, said sensor element further being connected to at least two points of said housing and having a free length between said connecting points so as to be stretched over the surface of the pipe when the transducer device is attached, and wherein at least one part of said sensor element is made in one piece with said housing.

2. A transducer device according to claim 1, wherein said sensor element comprises a piezoelectric tape, the opposite surfaces of said tape being in connection with electrically leading contact surfaces at least when the transducer is mounted to a hollow body to be measured.

3. A transducer device according to claim 1, wherein said sensor element is coated at least at one side thereof with a protecting layer.

4. A transducer device according to claim 1, wherein said sensor element comprises a sensitive part for detecting deformations of the surface of said hollow body and a clamping element which is fixedly secured to said housing.

5. A transducer device for measuring mechanical values on hollow bodies, especially for measuring pressure distributions within a pipe by detecting deformations in the outer surface thereof, comprising a housing for detachably enclosing the pipe whose outer surface deformation is to be measured, and at least one elastic sensor element being mounted in said housing, said sensor element being capable to at least indirectly contact the surface of said enclosed pipe and having electrical connections for taking off the measuring signals, said sensor element further being connected to at least two points of said housing and having a free length between said connecting points so as to be stretched over the surface of the pipe when the transducer device is attached, and wherein said sensor element comprises several layers with at least one of said layers being made in one piece with said housing.

6. A transducer device according to claim 1 or 5, wherein said part of said sensor element which is made in one piece with said housing is at least locally sensitive to the surface deformations to be detected.

7. A transducer device according to claim 5, wherein said sensor element comprises a piezoelectric tape, the opposite surfaces of said tape being in connection with electrically leading contact surfaces at least when the transducer is mounted to a hollow body to be measured.

8. A transducer device according to claim 5, wherein said sensor element is coated at least at one side thereof with a protecting layer.

9. A transducer device according to claim 5, wherein said sensor element comprises a sensitive part for detecting deformations of the surface of said hollow body and a clamping element which is fixedly secured to said housing.

10. A transducer device for measuring mechanical values on hollow bodies, especially for measuring pressure distributions within a pipe by detecting deformations in the outer surface thereof, comprising a bipartite housing for detachably enclosing the pipe whose outer surface deformation is to be measured, and at least one elastic sensor element being mounted in each part of said housing, said sensor element being capable to at least indirectly contact the surface of said enclosed pipe and having electrical connections for taking off the measuring signals, said sensor element further being connected to at least two points of said housing and having a free length between said connecting points so as to be stretched over the surface of the pipe when the transducer device is attached.

11. A transducer device according to claim 10, wherein said sensor element comprises a piezoelectric tape, the opposite surfaces of said tape being in connection with electrically leading contact surfaces at least when the transducer is mounted to a hollow body to be measured.

12. A transducer device according to claim 10, wherein said sensor element is coated at least at one side thereof with a protecting layer.

13. A transducer device according to claim 10, wherein said sensor element comprises a sensitive part for detecting deformations of the surface of said hollow body, and a clamping element which is fixedly secured to said housing.

14. A transducer device for measuring mechanical values on hollow bodies, especially for measuring pressure distributions within a pipe by detecting deformations in the outer surface thereof, comprising a housing for detachably enclosing the pipe whose outer surface deformation is to be measured, and at least one elastic sensor element being mounted in said housing, said sensor element being capable to at least indirectly contact the surface of said enclosed pipe and having electrical connections for taking off the measuring signals, said sensor element further being connected to at least two points of said housing and having a free length between said connecting points so as to be stretched over the surface of the pipe when the transducer device is attached, and wherein at least two sensitive parts of said sensor elements are allocated in said housing, so as to be arranged at least approximately symmetrically with respect to the major axis of the hollow body when the transducer is mounted.

15. A transducer device according to claim 14, wherein said sensor element comprises a piezoelectric tape, the opposite surfaces of said tape being in connection with electrically leading contact surfaces at least when the transducer is mounted to a hollow body to be measured.

16. A transducer device according to claim 14, wherein said sensor element is coated at least at one side thereof with a protecting layer.

17. A transducer device according to claim 14, wherein said sensor element comprises a sensitive part for detecting deformations of the surface of said hollow body and a clamping element which is fixedly secured to said housing.

* * * * *